(12) United States Patent
Rathi et al.

(10) Patent No.: US 9,935,782 B1
(45) Date of Patent: Apr. 3, 2018

(54) SCALABLE INTERNET GROUP MANAGEMENT PROTOCOL (IGMP) SNOOPING IN A SWITCH FABRIC

(71) Applicant: Cisco Technology, Inc., San Jose, CA (US)

(72) Inventors: Ravindra N. Rathi, Cupertino, CA (US); Pavan Ramakrishnaiah, San Jose, CA (US); Jialin Song, Cupertino, CA (US); Krishna Doddapaneni, Cupertino, CA (US); Sanjay Thyamagundalu, Sunnyvale, CA (US); Bharat Bandaru, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 247 days.

(21) Appl. No.: 14/685,983

(22) Filed: Apr. 14, 2015

(51) Int. Cl.
| | |
|---|---|
| *H04L 12/18* | (2006.01) |
| *H04L 12/933* | (2013.01) |
| *H04L 12/931* | (2013.01) |
| *H04L 12/26* | (2006.01) |
| *H04L 12/24* | (2006.01) |

(52) U.S. Cl.
CPC ........ *H04L 12/185* (2013.01); *H04L 41/0813* (2013.01); *H04L 43/065* (2013.01); *H04L 49/15* (2013.01); *H04L 49/201* (2013.01)

(58) Field of Classification Search
CPC .................................................... H04L 12/185
See application file for complete search history.

(56) References Cited

U.S. PATENT DOCUMENTS

| | | | |
|---|---|---|---|
| 7,983,205 B1* | 7/2011 | Blease | H04L 12/185 370/312 |
| 8,675,658 B2 | 3/2014 | Keesara et al. | |
| 8,849,989 B2* | 9/2014 | Shah | H04L 12/185 709/224 |
| 9,059,901 B1* | 6/2015 | Kumar C S | H04L 45/02 |
| 2005/0080901 A1 | 4/2005 | Reader | |
| 2005/0180448 A1* | 8/2005 | Kobayashi | H04L 12/185 370/432 |
| 2006/0209774 A1* | 9/2006 | Mori | H04L 12/18 370/338 |
| 2010/0172351 A1 | 7/2010 | Fernandez Gutierrez | |
| 2012/0163379 A1* | 6/2012 | Chen | H04L 45/16 370/390 |

(Continued)

*Primary Examiner* — Benjamin Lamont
(74) *Attorney, Agent, or Firm* — Edell, Shapiro & Finnan, LLC (57) ABSTRACT

Internet Group Management Protocol (IGMP) snooping includes flooding an IGMP query received at a border leaf switch from a multicast router connected to the multicast router to all host devices in a given bridge domain through leaf switches in the bridge domain, and receiving multiple join requests from the connected host devices at the leaf switches. The IGMP snooping also includes consolidating the multiple join requests received at the leaf switches into a multicast groups membership repository to indicate for each leaf switch the multicast group membership of interest in the given bridge domain, and sending the repository to the border leaf switch to enable the border leaf switch to send a consolidated IGMP proxy report on behalf of the leaf switches to the multicast router based on the repository and that indicates the multicast membership of interest in the given bridge domain.

23 Claims, 6 Drawing Sheets

(56) References Cited

U.S. PATENT DOCUMENTS

| | | | | |
|---|---|---|---|---|
| 2012/0218997 A1* | 8/2012 | Shah | .................... | H04L 12/185 |
| | | | | 370/390 |
| 2012/0218998 A1* | 8/2012 | Sarikaya | ............... | H04L 69/167 |
| | | | | 370/390 |
| 2012/0327764 A1* | 12/2012 | Han | .................... | H04L 12/185 |
| | | | | 370/219 |
| 2013/0058336 A1* | 3/2013 | Wadhwa | ................ | H04L 47/15 |
| | | | | 370/390 |
| 2013/0107699 A1* | 5/2013 | Miclea | .................. | H04L 45/68 |
| | | | | 370/228 |
| 2013/0136122 A1 | 5/2013 | Keesara et al. | | |
| 2013/0308636 A1* | 11/2013 | Bacthu | ................ | H04L 12/185 |
| | | | | 370/390 |
| 2013/0322441 A1* | 12/2013 | Anumala | ........... | H04L 12/4675 |
| | | | | 370/390 |
| 2014/0003285 A1* | 1/2014 | Jain | ........................ | H04L 45/66 |
| | | | | 370/254 |
| 2014/0036916 A1* | 2/2014 | Fernandez Gutierrez | ............... | H04L 12/185 |
| | | | | 370/390 |
| 2014/0269415 A1* | 9/2014 | Banavalikar | .......... | H04L 12/185 |
| | | | | 370/254 |
| 2015/0085862 A1* | 3/2015 | Song | .................. | H04L 12/4641 |
| | | | | 370/390 |
| 2016/0043878 A1* | 2/2016 | Hao | ..................... | H04L 12/185 |
| | | | | 370/390 |
| 2016/0211979 A1* | 7/2016 | Alarcon | ............. | H04L 65/4076 |

* cited by examiner

| IGMP TO RS MCAST MEMBERSHIP UPDATE |
|---|
| RS_ADD OR RS_DELETE — 305 |
| IPv4 VS. IPv6, BRIDGED VS. ROUTED, FILTER MODE — 310 |
| MULTICAST SOURCE IP ADDRESS — 315 |
| MULTICAST GROUP IP — 320 |
| IGMP VERSION — 325 |
| FABRIC BD VNID — 330 |
| PUBLISHING TIMESTAMP — 335 |
| LEAF PHYSICAL IP ADDRESS — 340 |

| IGMP TO RS MCAST ROUTER UPDATES |
|---|
| RS_ADD OR RS_DELETE — 405 |
| IPv4 VS. IPv6, BRIDGED VS. ROUTED — 410 |
| FABRIC BD VNID — 415 |
| PUBLISHING TIMESTAMP — 420 |
| LEAF PHYSICAL IP ADDRESS — 425 |

| RS TO IGMP NOTIFICATION |
|---|
| RS_ADD OR RS_DELETE — 505 |
| IPv4 VS. IPv6, BRIDGED VS. ROUTED, FILTER MODE — 510 |
| MULTICAST SOURCE IP ADDRESS — 515 |
| MULTICAST GROUP IP — 520 |
| IGMP VERSION — 525 |
| PUBLISHING TIMESTAMP — 530 |
| FABRIC BD VNID — 535 |

SCALABLE INTERNET GROUP MANAGEMENT PROTOCOL (IGMP) SNOOPING IN A SWITCH FABRIC

TECHNICAL FIELD

The present disclosure relates to Internet Group Management Protocol (IGMP) snooping in a communication network.

BACKGROUND

A switch fabric includes spine switches interconnected with leaf switches. The leaf switches are connected with host devices and multicast routers. Internet Group Management Protocol (IGMP) snooping is a technique supported by the switch fabric to enable the host devices to inform the multicast routers of interest in multicast traffic. In IGMP snooping, IGMP queries from the multicast routers in bridge domains configured on the multicast routes are flooded to the host devices through leaf switches configured for the bridge domains. The host devices respond with IGMP reports to indicate interest in multicast traffic in the bridge domains. The switch fabric may include hundreds or even thousands of the leaf switches and correspondingly may support hundreds of thousands of the host devices spread across thousands of bridge domains. Thus, the number of individual IGMP reports sent by the host devices to the multicast routers in response to the IGMP queries can easily overwhelm the capacity of the multicast routers to process all of the IGMP reports. Also, in some instance, one or more of the multicast routers may not be available to send IGMP queries in given bridge domains due to failure of the multicast routers or departure of the multicast routers from the bridge domains. Nevertheless, it is desirable that IGMP queries continue to be sent in the bridge domains to solicit the IGMP reports.

DESCRIPTION OF EXAMPLE EMBODIMENTS

Overview

A switch fabric includes interconnected leaf and spine switches that collectively perform Internet Group Management Protocol (IGMP) snooping in which (i) an IGMP query received at a border leaf switch from a multicast router connected to the border leaf switch is flooded to all host devices in a given bridge domain to which the query is directed through leaf switches in the bridge domain, and (ii) responsive to the flooding, multiple join requests from the connected host devices are received at the leaf switches by which the host devices indicate interest in multicast group membership in the given bridge domain. One or more switches in the switch fabric consolidate the multiple join requests received at the leaf switches into a multicast groups membership repository to indicate for each leaf switch the multicast group membership of interest in the given bridge domain as expressed in the multiple join requests, and send the repository to the border leaf switch to enable the border leaf switch to send a consolidated IGMP proxy report on behalf of the leaf switches to the multicast router based on the repository and that indicates the multicast membership of interest in the given bridge domain.

Example Embodiments

Figure 1:
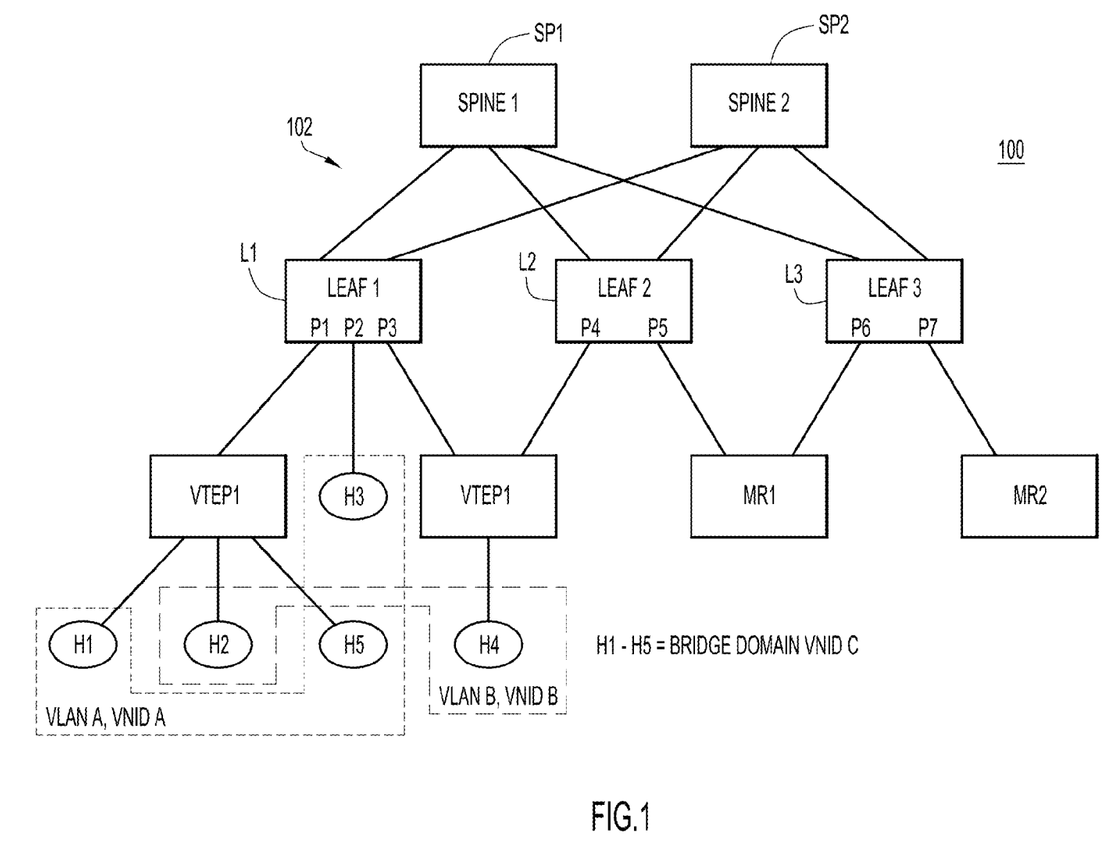
FIG. 1 is block diagram of a network environment in which embodiments of Internet Group Management Protocol (IGMP) snooping may be implemented, according to an example embodiment.

Referring first to FIG. 1, there is shown a block diagram of an example network environment 100 in which embodiments of Internet Group Management Protocol (IGMP) snooping may be implemented. Network environment 100 includes a spine-leaf cluster network topology or network switch fabric 102 coupled with multiple multicast routers MR1 and MR2, virtual extended local area network (Vx-LAN) tunnel endpoints (VTEPs) VTEP1 and VTEP2, and host devices H1-H5. Host devices H1-H5 (also referred to herein simply as "hosts") may represent server and/or client devices. For example, host devices H1-H5 may each represent a server device that hosts virtual machines (VMs), server applications, or client applications. VTEPs VTEP1 and VTEP2 may be omitted in other embodiments of network environment 100.

Switch fabric 102 includes multiple spine switch devices SP1 and SP2 (also referred to simply as "spine switches" or "spines") and multiple leaf switch devices L1-L3 (also referred to simply as "leaf switches" or "leafs") connected to the spine switches by a network fabric, such as, but not limited to, FabricPath technology by Cisco Systems, Inc. Spine switches SP1 and SP2 and leaf switches L1-L3 are shown to be 2-tier fat tree or Clos, with each leaf switch connected to each spine switch and each spine switch connected to each leaf switch via network fabric 110. Together, spine and leaf switches SP1 and SP2 and L1-L3 form the backbone of a scalable multipath data center fabric. Spine and leaf switches SP1 and SP2 and L1-L3 may each support functionality as defined by Open Systems Interconnection (OSI) model Layer 2 or Layer 3, and include switching and/or routing capabilities. It should also be appreciated that the topology in FIG. 1 is shown merely as an example, and any number of combinations of physical servers, leaf switches, spine switches, and hosts, and multicast routers may be present in network environment 100.

Leaf switches L1-L3 include rear-facing ports to connect with spine switches SP1 and SP2. Leaf switches L1-L3 also include front-facing ports P1-P7 to connect with respective host devices H1-H5, VTEPs VTEP1 and VTEP 2, and multicast routers MR1 and MR2, as depicted in FIG. 1. Leaf switches L2 and L3 connected to multicast routers MR1 and MR2, respectively, are referred to herein as "border leaf switches." Multicast routers MR1 and MR2 route multicast traffic into and out of switch fabric 102 via border leaf switches L2 and L3.

Hosts H1-H5 each participates in one or more virtual networks, such as local area networks (VLANs), configured in switch fabric 102. To this end, leaf switches L2 and L3 may each be configured to support the one or more virtual networks. The virtual networks are identified using virtual network identifiers (VNIDs). In the example of FIG. 1, hosts H1, H3, and H5 are part of a VLAN A (i.e., a networked group of hosts identified with VNID A), while hosts H2 and H4 are part of a VLAN B identified with VNID B. Also, all of hosts H1-H5 are present in a given (i.e., the same) bridge domain (BD). A "bridge domain" represents an OSI Layer 2 broadcast domain in which all of the hosts in the bridge domain (e.g., H1-H5) are accessible through Layer 2 connections in switch fabric 102. The bridge domain is like a VLAN identified with a VNID and in which media access control (MAC)-based forwarding of packets is used for communications between participants/hosts. In the example of FIG. 1, all of hosts H1-H5 are in a bridge domain associated and identified with a VNID C, which may also be a VLAN.

Multicast routers MR1 and MR2 send multicast traffic to hosts H1-H5 via border leaf switches L2 and L3, spine switches SP1 and SP2, and leaf switches L1 and L2. Multicast routers MR1 and MR2 broadcast the multicast traffic to multicast groups in given bridge domains and in which various ones of hosts H1-H5 have previously expressed interest through IGMP snooping, described below. A given multicast group is identified by an Internet Protocol (IP) group addresses "GIPi." Multicast routers MR1 and MR2 rely on the IGMP report messages (or "reports") to determine which of hosts H1-H5 are interested in which multicast groups in which bridge domains. Using conventional IGMP snooping, multicast routers (e.g., multicast routers MR1 and MR2) receive an overwhelming amount of IGMP related overhead traffic from leaf switches (e.g., leaf switches L1-L3) connected with hosts (e.g., hosts H1-H5). IGMP snooping embodiments presented herein reduce the amount of IGMP related overhead traffic received at the multicast routers compared to conventional IGMP snooping.

Figure 2:
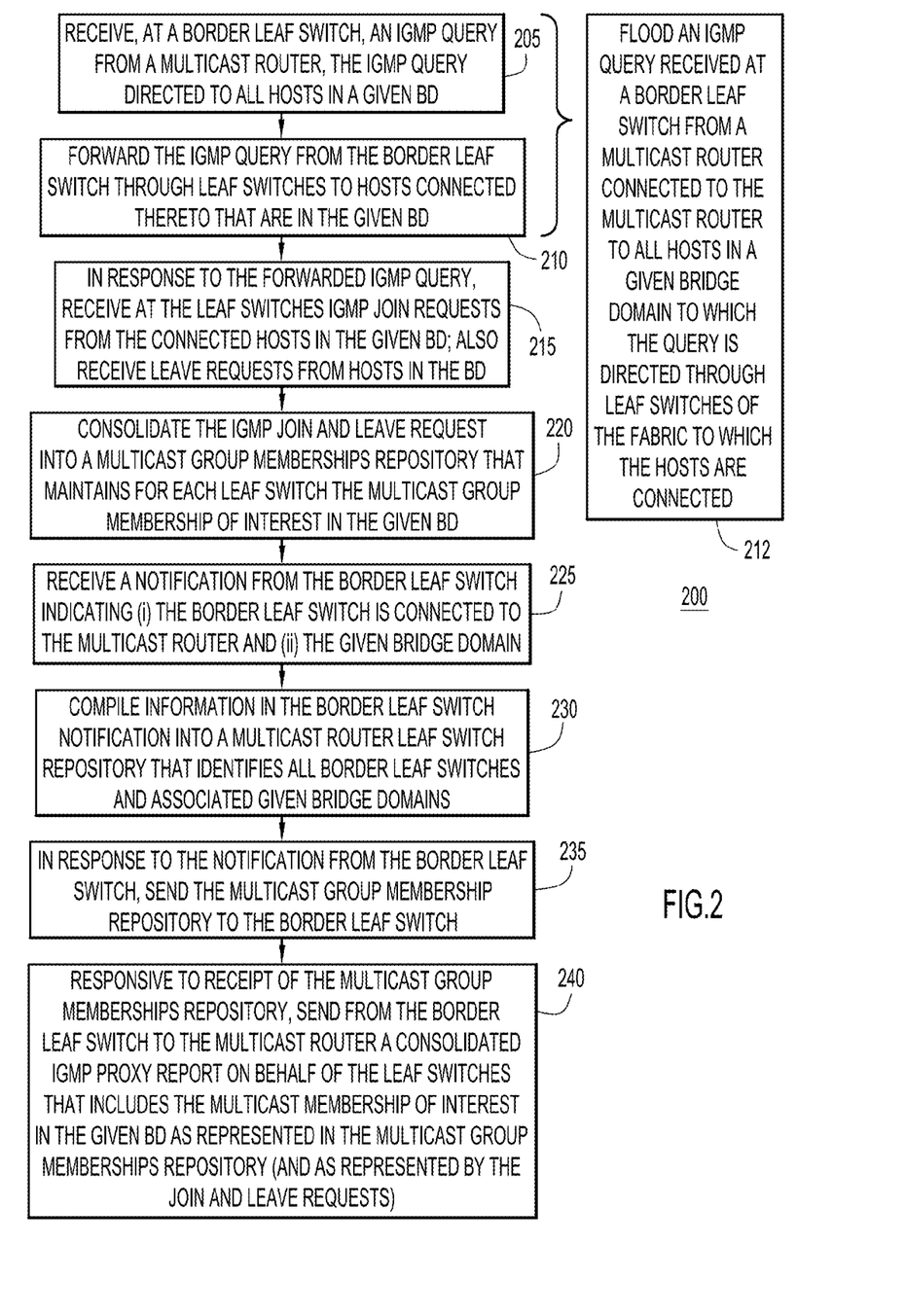
FIG. 2 is a flowchart of a method of IGMP snooping performed in a switch fabric of FIG. 1 that reduces IGMP overhead traffic received at multicast routers, according to an example embodiment.

With reference to FIG. 2, there is depicted a flowchart of an example method 200 of IGMP snooping performed in switch fabric 102 that reduces the IGMP overhead traffic received at multicast routers MR1 and MR2. The description of method 200 refers to various ones of the switches and multicast routers depicted in FIG. 1 by way of example only; other switches and multicast routers across switch fabric 102 may implement the method.

At 205, multicast router MR1 sends an IGMP query for a given multicast group GIPi in given bridge domain VNID C to border leaf switches L2, which receive the IGMP query. In an example, the IGMP query is targeted to all hosts at IP address 224.0.0.1 in the given bridge domain.

At 210, border leaf switch L2 forwards the IGMP query through switch fabric 102, including all front-facing ports of leaf switches L1 and L2 configured for the given bridge domain VNID C, to hosts H1-H5 connected to the front-facing ports, directly or indirectly through VTEPs VTEP1 and VTEP2. Together, operations 205 and 210 represent an operation 212 to flood the IGMP query received at border leaf switch L2 from multicast router MR1 to all hosts H1-H5 in given bridge domain VNID C through the front-facing ports of leaf L1 and L2 configured for that bridge domain.

At 215, hosts H1-H5 in given bridge domain VNID C that received the flooded IGMP query and are interested in receiving multicast traffic in the given multicast group GIPi send respective IGMP join reports (referred to simply as "IGMP reports") indicating interest in the given multicast group GIPi in bridge domain VNID C to the leaf switches to which they are connected. In an example in which all of hosts H1-H5 in given bridge domain VNID C are interested in receiving traffic in multicast group GIPi, hosts H1-H5 send respective IGMP reports indicating that interest to leaf switch L1, which receives the IGMP reports. In addition, leaf switch L2 receives an IGMP report from host H4 indicating interest in multicast group GIPi in bridge domain VNID C. Various ones of hosts H1-H5 may send IGMP leave reports to announce that the hosts are no longer interested in the given multicast group GIPi in the bridge domain VNID C. In response to receiving IGMP join reports, the leaf switches each record the front-facing ports from which the IGMP reports were received to enable the leaf switches to broadcast multicast traffic from the multicast routers only to those ports in the future as appropriate.

In conventional IGMP snooping, all of the leaf switches that receive individual IGMP reports for a given multicast group in a given bridge domain forward their respective individual IGMP reports through switch fabric 102, including the border leaf switches, to the multicast router that sent the IGMP query. For example, in conventional IGMP snooping, leaf switches L1 and L2 would both forward duplicative IGMP reports indicating interest in multicast group GIPi in bridge domain VNID C to multicast router MR1. Because a practical switch fabric may include hundreds of thousands of hosts spread across thousands of bridge domains each of which encompasses many leaf switches, the number of IGMP reports from the leaf switches across the bridge domains can overwhelm the multicast router, which has to process the IGMP reports. In a practical switch fabric, a multicast router may receive 8000 (the maximum number of multicast groups across all bridge domains)*100 (the average no. of leaf switches per bridge domain and per multicast groups)=800K individual IGMP reports. Assuming 10 multicast routers to serve all the bridge domains, each multicast router may have to process 80K IGMP reports received in response to sending out the periodic IGMP queries periodic general queries. This is an overwhelming number of reports for a multicast router to have to process.

Accordingly, the IGMP snooping embodiment performed in accordance with operations 220-250 (described below) consolidates the individual IGMP reports into a consolidated repository of reports referred to as a multicast groups membership repository and then sends the consolidated repository to the multicast routers in lieu of the individual reports, which greatly reduces IGMP report processing in the multicast router.

At 220, leaf switches L1 and L2 provide their received IGMP reports to a Repository Service (RS) executed on one or more of the switches in switch fabric 102, such as spine switch SP1 and/or spine switch SP2. The Repository Service implements features of IGMP snooping as described herein, and may reside in one or more of the switches in switch fabric 102. As such, the Repository Service may execute logic on the one or more switches to perform various IGMP snooping related functions on the switches, and cause the switches to exchange messages in support of the IGMP snooping. Example of such messages are described below in connection with FIGS. 3-5A.

In an example of operation 220, each of leaf switches L1/L2 may provide the IGMP reports to the Repository Service in a form such as "leaf switch L1/L2 is interested in multicast traffic for {bridge domain VNID C, multicast group GIPi}." Similarly, if hosts connected to leaf switch L1 or L2 leave multicast group GIPi in bridge domain VNID C, the leaf switch may provide an IGMP report to the Repository Service to withdraw the multicast group from the bridge domain. The leaf switches IGMP to Repository Service reports may follow a message format described below in connection with FIG. 3.

As mentioned above, conventional IGMP snooping would forward each of the individual multiple join (and leave) reports to the multicast router that sent the IGMP query to which the joins were a response, which would likely overwhelm the multicast router. In the embodiment of IGMP snooping presented herein, rather than forwarding all of the individual IGMP reports to the multicast router, the Repository Service consolidates the individual IGMP reports (e.g., join and leave reports) received from leaf switches L1 and L2 across the leaf switches into single entries of the multicast groups membership repository. The consolidated repository (i.e., the multicast groups membership repository) maintains for each leaf switch the multicast group membership of interest in the given bridge domain as indicated by the join and leave reports. Each (one) of the entries of the repository consolidates multiple join (and leave) reports received from and across leaf switches for a given multicast group in a given bridge domain. If leave reports indicate that there is no longer any interest in a given multicast group in a given bridge domain that was previously indicated in an entry of the repository, then the Repository Service removes or deletes that entry from the repository. Each entry in the repository may follow the following example format: {multicast group GIPi, source IP address, bridge domain VNID, IGMP version, (reporting) leaf switch IP address}. An example multicast groups membership repository is illustrated in FIG. 5B, described below.

At 225, the Repository Service receives notifications from border leaf switches L2 and L3 (and other border leaf switches across switch fabric 102) indicating the border leaf switches are connected with multicast routers MR1 and MR2, respectively, and the given bridge domains associated with each multicast router connection (e.g., bridge domain VNID C associated with multicast router MR1). In an example, the notifications take the form of "border leaf switch L2/L3 is interested in knowing about group membership in a given bridge domain." The border leaf notifications may follow a message format described below in connection with FIG. 4.

At 230, responsive to the notifications at 225, the Repository Service compiles the information in the border leaf switch notifications into a multicast router leaf switch repository that identifies all border leaf switches and associated given bridge domains, e.g., multicast router MR1 associated with bridge domain VNID C, multicast router MR2 associate with bridge domain VNID I, and so on. An example multicast router leaf switch repository is illustrated in FIG. 5C, described below.

At 235, also in response to the notifications at 225, the Repository Service sends the multicast groups membership repository to each of border leaf switches L2 and L3.

At 240, responsive to receipt of the multicast groups membership repository by each border leaf switch (e.g., each border leaf switch L2/L3), and whenever each border leaf switch receives an IGMP query from the respective connected multicast router (e.g., multicast router MR1/MR2), the border leaf switch sends to the respective connected multicast router a consolidated IGMP proxy report on behalf of the leaf switches (e.g., leaf switches L2 and L3) that includes the multicast membership of interest in the given bridge domain as represented in the multicast groups membership repository. For example, each border leaf switch reports relevant entries from the multicast groups membership repository to the connected multicast router in lieu of the many individual join and leave reports the multicast router would normally receive from the leaf switches.

Figure 3:
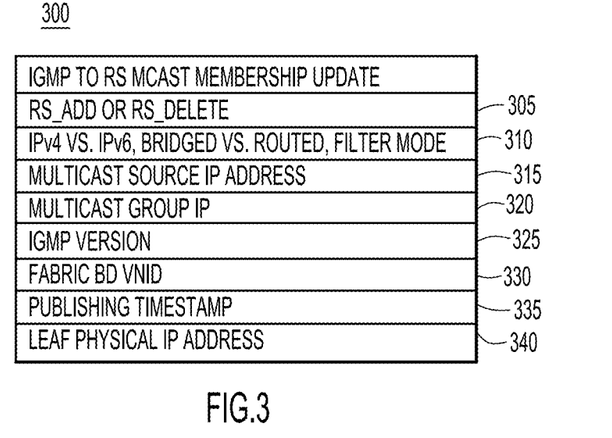
FIG. 3 is an illustration of an "IGMP snooping to a Repository Service multicast membership update" message sent by leaf switches to the Repository Service to inform the Repository Service about multicast group membership as represented in join and leave reports from host devices connected with the leaf switches, according to an example embodiment.

With reference to FIG. 3, there is an illustration of an example "IGMP snooping to Repository Service (RS) multicast ('mcast') membership update" message 300 sent by leaf switches (e.g., leaf switches L2 and L3) to the Repository Service to inform the Repository Service about multicast group membership as represented in join and leave reports from hosts connected with the leaf switches. In the example of FIG. 1, instances of message 300 are sent by leaf switches L2 and L3 at operation 220, and information from each such instance may form an entry in the multicast groups membership repository. Message 300 includes a field 305 to indicate whether a multicast group is to be created because a join report has been received from a first host to join a multicast group ("RS_ADD" for "Repository_Service_ADD") or a multicast group is to be removed because a leave report has indicated no more interest in the multicast group ("RS_DELETE"). Message 300 also includes a flags field 310 to indicate various communication network features of the multicast group, as indicated in FIG. 3. Message 300 also includes a multicast source IP address 315, a multicast group address 320 (e.g., GIPi), an IGMP version number 325, a bridge domain VNID 330, a publishing timestamp 335, and a leaf switch physical IP address 335.

Figure 4:
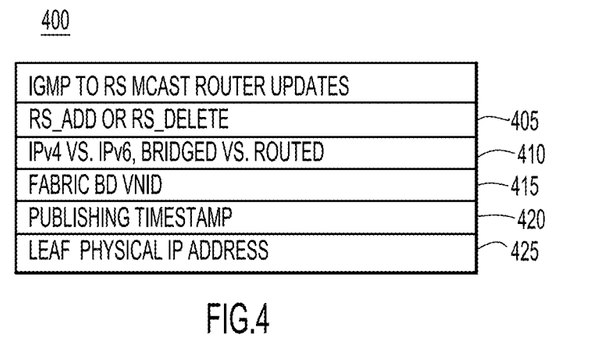
FIG. 4 is an illustration of an "IGMP snooping to Repository Service multicast router update message" sent by border leaf switches to the Repository Service to inform the Repository Service about interest by the border leaf switches in knowing multicast group membership information as represented in the multicast groups membership repository, according to an example embodiment.

With reference to FIG. 4, there is an illustration of an example "IGMP snooping to RS multicast router update" message 400 sent by border leaf switches (e.g., border leaf switches L2 and L3) to the Repository Service to inform the Repository Service about their interest in knowing multicast group membership information as represented in the multicast groups membership repository. In the example of FIG. 1, instances of message 400 are sent by border leaf switches L2 and L3 at operation 225, and information from each such instance may form an entry in the multicast router leaf switch repository. Message 400 includes a field 405 to indicate whether the border leaf has discovered a connected multicast router in a bridge domain ("RS_ADD") or a multicast router port is removed from a bridge domain ("RS_DELETE"). Message 400 also includes a flags field 410 to indicate various communication network features, as indicated in FIG. 4. Message 400 a bridge domain VNID 415, a publishing timestamp 420, and a border leaf switch physical IP address 335.

Figure 5A:
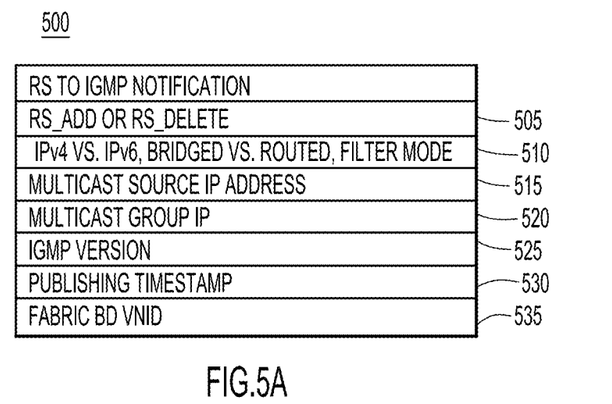
FIG. 5A is an illustration of a "Repository Service to IGMP snooping" message sent by the Repository Service to border leaf switches that have expressed interest in knowing about group membership updates, according to an example embodiment.
Figure 5B:
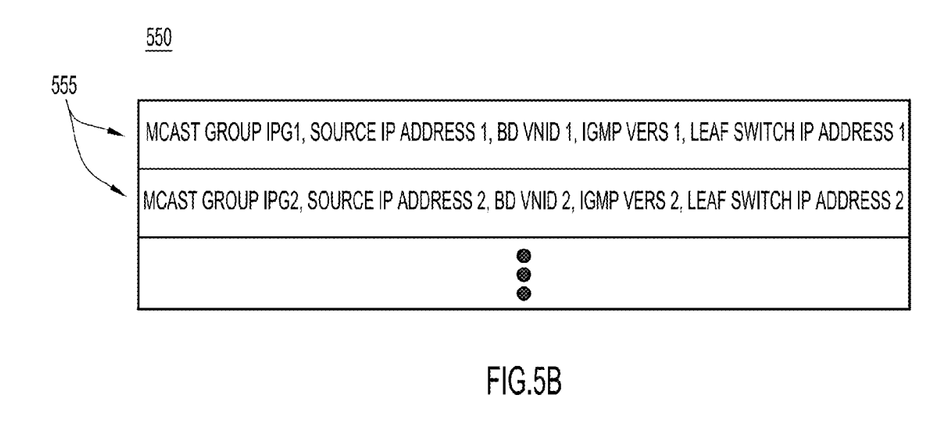
FIG. 5B is an illustration of a multicast groups membership repository, according to an example embodiment.
Figure 5C:
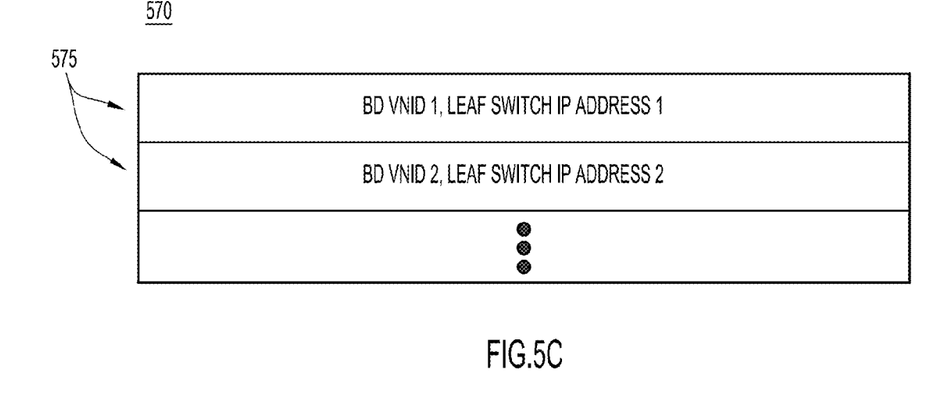
FIG. 5C is an illustration of a multicast router leaf switch repository, according to an example embodiment.

With reference to FIG. 5A, there is an illustration of an example "RS to IGMP snooping" message 500 sent by the Repository Service to border leaf switches (e.g., border leaf switches L2 and L3) that have expressed interest in knowing about group membership updates via message 400.

Instances of message 500 are sent by the Repository Service to border leaf switches L2 and L3 at operation 235. Message 500 includes a field 505 to indicate whether a multicast group has been created ("RS_ADD") or a multicast group is to be removed ("RS_DELETE"). Message 300 also includes a flags field 510 to indicate various communication network features of the multicast group, as indicated in FIG. 5A. Message 500 also includes a multicast source IP address 515, a multicast group address 520, an IGMP version number 525, a publishing timestamp 530, and a bridge domain VNID 535.

With reference to FIG. 5B, there is an illustration of an example multicast groups membership repository 550. Repository 550 includes entries 555 each of which consolidates IGMP join (and leave) reports from multiple leaf switches in a given bridge domain. Each of entries 550 includes a multicast group address (e.g., GIP1), a source IP address used for IGMP snooping, a bridge domain identifier (e.g., VNID 1), an IGMP version number, and a leaf switch physical IP address.

With reference to FIG. 5C, there is an illustration of an example multicast router leaf switch repository 570. Repository 570 includes entries 575 to identify border leaf switches by their IP addresses and associated bridge domains by their VNID.

The embodiments described above assume generally that multicast routers MR1 and/or MR2 operate as IGMP snooping queriers to send IGMP queries to hosts H1-H5 across switch fabric 102. In the absence of multicast routers MR1 and MR2, IGMP snooping querier functionality may be enabled on and across the various leaf switches (e.g., leaf switches L1-L3) of switch fabric 102 to provide one or more sources of IGMP queries in place of the multicast routers. Because switch fabric 102 may include a large number of leaf switches and a given bridge domain may deployed on many of the leaf switches, it is advantageous to be able to enable IGMP snooping querier functionality in switch fabric 102 in a relatively straight forward manner that scales with an increase in the number of bridge domains and leaf switches. Two primary considerations for enabling IGMP snooping querier functionality in the switches of switch fabric 102 include:
  a. Redundancy—IGMP querier functionality should be enabled on at least two leaf switches where bridge domains are deployed so that even if one of the leaf switches is removed, the other of the leaf switches is available to take over a role of IGMP querier; and
  b. IP address—IGMP querier functionality requires an IP address which is used as a source IP address in the IGMP query and also for an election of an IGMP querier in the given bridge domain.

A distributed IGMP querier embodiment presented herein distributes IGMP querier functionality across leaf switches in switch fabric 102 in a way that accommodates the above two considerations. The distributed IGMP querier embodiment enables IGMP querier functionality on all switch leafs (e.g., all of leaf switches and border leaf switches L1-L3 are enabled as IGMP queriers) in switch fabric 102 where a bridge domain is present and associates the same source IP address with all of them. Under the distributed IGMP querier embodiment, each leaf switch operates as if it is the only IGMP querier to originate IGMP queries for a given bridge domain in switch fabric 102. Under the IGMP querier embodiment, each leaf switch L1-L3 is constrained to flood IGMP queries that the leaf switch originates only to front-facing ports of the leaf switch that are configured for a given bridge domain; no IGMP queries originated by the leaf switch are sent from rear-facing ports of the switch to spine switches. The distributed IGMP querier embodiment operates even when a given border leaf in switch fabric 102 is connected to a multicast router, in which case the border leaf and the multicast router connected thereto undertake an IGMP querier election procedure to elect either the leaf switch or the multicast router as a designated IGMP querier in a given bridge domain based on "same querier election rules," as described below.

Figure 6:
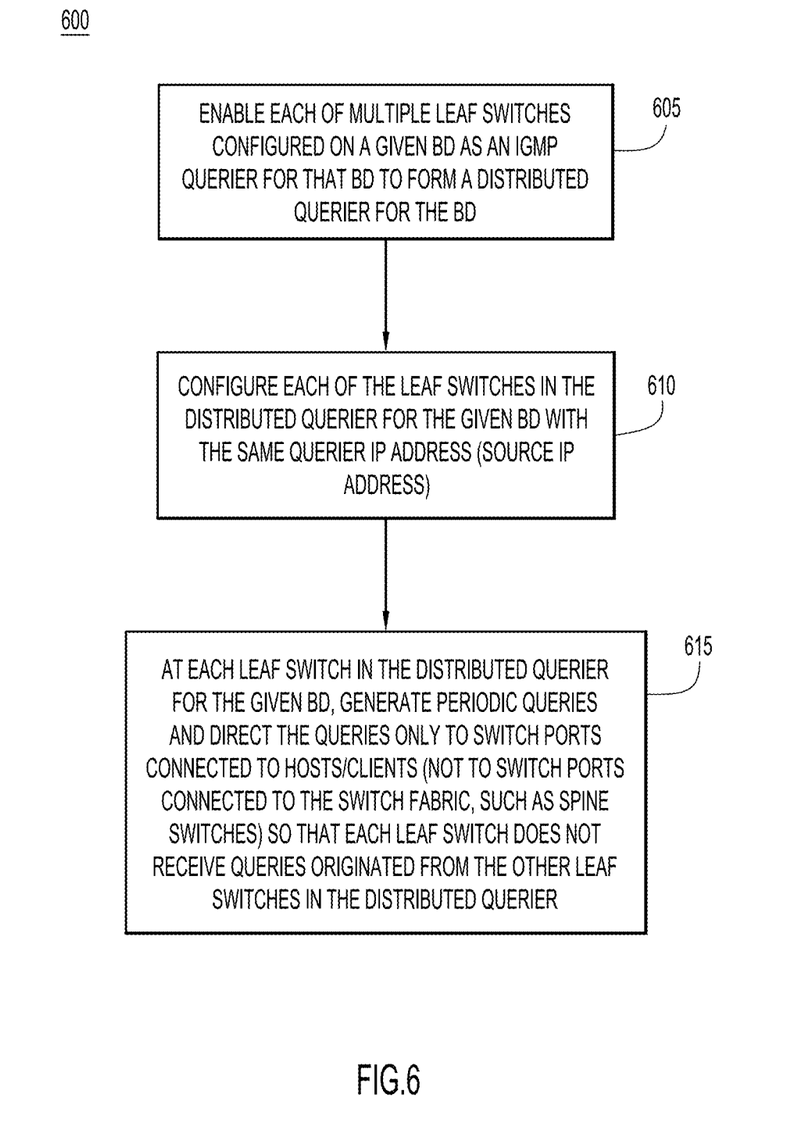
FIG. 6 is a flowchart of a method of distributing an IGMP querier across leaf switches in the switch fabric, according to an example embodiment.

With reference to FIG. 6, there is a flowchart of an example method 600 of distributing an IGMP querier across leaf switches in switch fabric 102. In the example of FIG. 1, IGMP querier functionality is distributed across leaf switches L1-L3.

At 605, each of leaf switches L1-L3 configured on a given bridge domain is enabled as an IGMP querier for the bridge domain, to form a distributed IGMP querier for the bridge domain.

At 610, each of leaf switches L1-L3 in the distributed IGMP querier for the bridge domain is configured with the same IGMP querier IP address (i.e., source IP address).

At 615, each of leaf switches L1-L3 in the distributed IGMP querier for the bridge domain generates (i.e., originates) periodic IGMP queries and directs those generated IGMP queries only to front-facing switch ports connected to hosts (e.g., hosts H1-H5) so that each leaf switch does not receive IGMP queries originated from other ones of the leaf switches in the distributed IGMP querier for the bridge domain. If any of multicast routers MR1 and MR2 are connected to any of the front-facing ports of the leaf switches (as depicted in FIG. 1 for example), those multicast routers receive the IGMP queries sent by the leaf switch in the given bridge domain and vice versa (i.e., the leaf switch exchanges IGMP queries with the multicast router to which the leaf switch is connected). In that situation, the leaf switch and the multicast router connected thereto undertake an IGMP querier election procedure that uses "same querier election rules" to elect either the leaf switch or the multicast router as the designated querier for the given bridge domain. The election rules compare the source IP address in the IGMP query from the leaf switch against the source IP address in the IGMP query from the multicast router, and elect the one of the leaf switch and the multicast router having a lowest source IP address as the designated IGMP querier.

Figure 7:
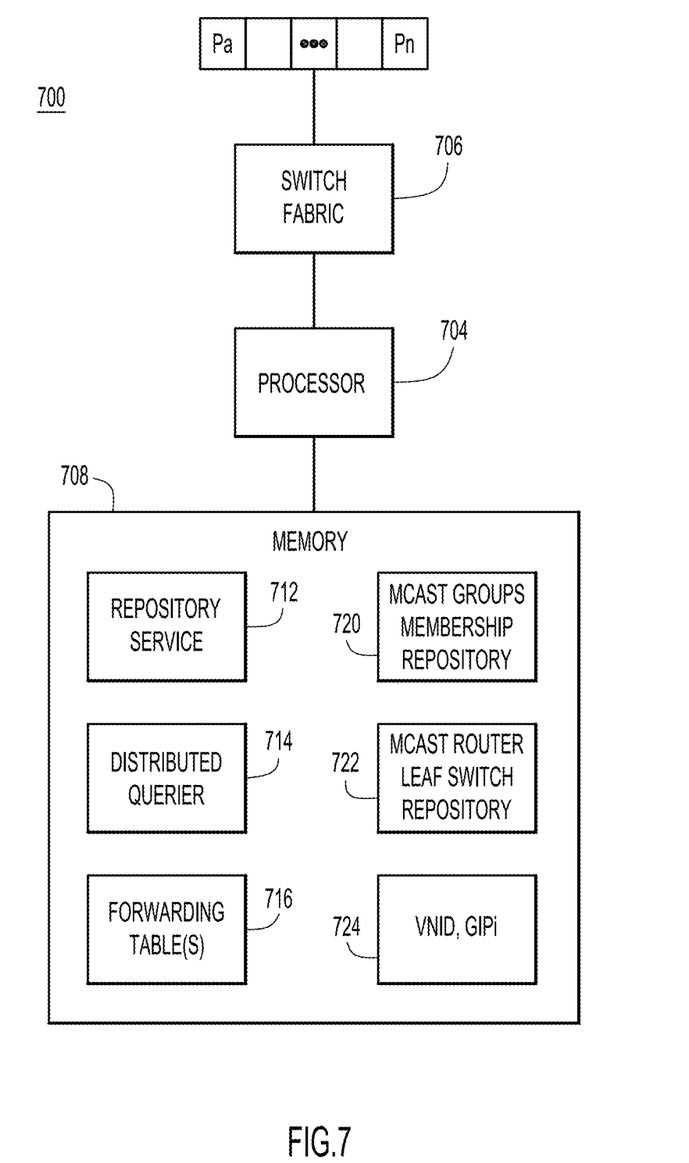
FIG. 7 is a block diagram of a switch device representative of a leaf switch, a border leaf switch, and a spine switch, according to an example embodiment.

With reference to FIG. 7, there is shown an example block diagram of a network switch 700 representative of a leaf switch, a spine switch, or a border leaf switch and configured to perform operations related to IGMP snooping as described herein. There are numerous possible configurations for network switch 700 and FIG. 7 is meant to be an example. Network switch 700 includes a network interface unit 702, a processor 704, and memory 708. The network interface (I/F) unit 702 includes Ethernet card devices for example configured with physical ports Pa-Pn to allow network switch 700 to communicate over a network, e.g., a wired network. Ports Pa-Pn may be divided among front-facing ports to connect with host devices, client devices, and routers, and rear-facing ports to connect with other network switches. Network I/F unit 702 may also include wireless connection capability. Processor 704 is a microcontroller or microprocessor, for example, configured to execute software instructions stored in the memory 708.

The memory 708 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 708 may comprise one or more computer readable storage media (e.g., a memory device) encoded with software comprising computer executable instructions and when the software is executed (by processor 704) it is operable to perform the operations described herein. For example, memory 708 stores or is encoded with Repository Service logic 712 to perform IGMP snooping and Repository Service related to the IGMP snooping as described in method 200, and Distributed Querier logic 714 to implement distributed IGMP querier functionality as described in method 600. In addition, the memory 708 stores data used and generated by logic 712 and 714, including but not limited to a multicast groups membership repository 720, a multicast router leaf switch repository 722, and other information 724, such as bridge domain and VLAN IDs, multicast group identifiers (e.g., GIPi), and the like.

In summary, an IGMP snooping embodiment presented herein reduces the number of IGMP reports normally reported to multicast routers compared to conventional techniques. To do this, a switch fabric consolidates multiple IGMP reports received at leaf switches across the leaf switches, to produce IGMP reports consolidated into a repository. The switch fabric sends the repository of consolidated IGMP reports to border leaf switches. In turn, the border leaf switches send to multicast routers connected thereto information from the IGMP proxy reports on behalf of the leaf switches and representative of the multiple IGMP requests that indicates the multicast membership of interests in the given bridge domain indicated in the repository.

In summary, in one form, a method is provided comprising: at one or more network switches of a switch fabric, the switch fabric including interconnected leaf and spine switches that collectively perform Internet Group Management Protocol (IGMP) snooping in which (i) an IGMP query received at a border leaf switch from a multicast router connected to the border leaf switch is flooded to all host devices in a given bridge domain to which the query is directed through leaf switches in the bridge domain, and (ii) responsive to the flooding, multiple join requests from the connected host devices are received at the leaf switches by which the host devices indicate interest in multicast group membership in the given bridge domain: consolidating the multiple join requests received at the leaf switches into a multicast groups membership repository to indicate for each leaf switch the multicast group membership of interest in the given bridge domain as expressed in the multiple join requests; and sending the repository to the border leaf switch to enable the border leaf switch to send a consolidated IGMP proxy report on behalf of the leaf switches to the multicast router based on the repository and that indicates the multicast membership of interest in the given bridge domain.

In another form, another method directed to Internet Group Management Protocol (IGMP) snooping in a switch fabric including spine and leaf switches is provided, comprising: flooding an IGMP query received at a border leaf switch from a multicast router connected to the multicast router to all host devices in a given bridge domain to which the query is directed through leaf switches of the fabric to which the host devices are connected; accessing, at the border leaf switch, a multicast groups membership repository that consolidates multiple join requests received at the leaf switches from the connected host devices and by which the host devices indicate interest in multicast group membership in the given bridge domain, wherein the repository indicates for each leaf switch the multicast group membership of interest in the given bridge domain as expressed in the join requests; and sending from the border leaf switch to the multicast router a consolidated IGMP proxy report representative of the multiple join requests that indicates the multicast membership of interests in the given bridge domain indicated in the accessed repository.

In still another form, a non-transitory computer readable storage medium stores instructions that, when executed by a processor on a network switch in a switch fabric, the switch fabric including interconnected leaf and spine switches that collectively perform Internet Group Management Protocol (IGMP) snooping in which (i) an IGMP query received at a border leaf switch from a multicast router connected to the multicast router is flooded to all host devices in a given bridge domain to which the query is directed through leaf switches in the bridge domain, and (ii) responsive to the flooding, multiple join requests from the connected host devices are received at the leaf switches by which the host devices indicate interest in multicast group membership in the given bridge domain, cause the processor to: consolidate the multiple join requests received at the leaf switches into a multicast groups membership repository to indicate for each leaf switch the multicast group membership of interest in the given bridge domain as expressed in the multiple join requests; and send the repository to the border leaf switch to enable the border leaf switch to send a consolidated IGMP proxy report on behalf of the leaf switches to the multicast router based on the repository and that indicates the multicast membership of interest in the given bridge domain.

In a further form, another method is provided, comprising: in a switch fabric including interconnected spine and leaf switches, the leaf switches configured to connect with host devices and multicast routers on front-facing ports of the leaf switches and the spine switches on rear-facing ports of the leaf switches; distributing Internet Group Management Protocol (IGMP) querier functionality across the leaf switches and the border leaf switches for the given bridge domain by: enabling each of the leaf switches to operate as an IGMP querier to flood IGMP queries only to front-facing ports of the leaf switch configured for a given bridge domain and not to rear-facing ports of the leaf switch to prevent each leaf switch from receiving IGMP snooping queries from any other leaf switch; and configuring each of the leaf switches configured on the given bridge domain with a same IGMP source Internet Protocol (IP) address for the IGMP queries.

Although one or more of apparatuses, systems, methods, and computer program products are illustrated and described herein as embodied in one or more specific examples, it is nevertheless not intended to be limited to the details shown, since various modifications and structural changes may be made therein without departing from the scope of the apparatuses, systems, methods, and computer program products and within the scope and range of equivalents of the claims. Accordingly, it is appropriate that the appended claims be construed broadly and in a manner consistent with the scope of the one or more of the apparatus, system, and method, as set forth in the following claims.

What is claimed is:

1. A method comprising:
at a repository service hosted on one or more network switches of a spine-leaf cluster switch fabric, the switch fabric including interconnected leaf and spine switches that collectively perform Internet Group Management Protocol (IGMP) snooping in which (i) an IGMP query, originated at a multicast router that routes multicast traffic into and out of the switch fabric and that is received at a border leaf switch connected to the multicast router, is flooded to all host devices connected to the switch fabric in a given bridge domain to which the query is directed through leaf switches in the bridge domain, and (ii) responsive to the flooding, multiple IGMP join requests from the connected host devices are received at the leaf switches by which the host devices indicate interest in multicast group membership in the given bridge domain:

receiving, by the repository service, from the leaf switches the multiple IGMP join requests, and IGMP leave requests that indicate various ones of the host devices that are no longer interested in multicast group membership in a respective bridge domain;

consolidating, by the repository service, the multiple IGMP join requests received at the leaf switches into entries of a multicast groups membership repository stored with the repository service and that indicate for each leaf switch the multicast group membership of interest in the given bridge domain as expressed in the multiple IGMP join requests, and deleting entries of the multicast groups membership repository corresponding to each leaf switch that is no longer interested in multicast group membership as expressed by the IGMP leave requests, wherein the multicast groups membership repository includes entries that collectively identify multicast group membership across multiple bridge domains over time; and by the repository service, receiving a notification from the border leaf switch indicating the border leaf switch is connected to the multicast router and the given bridge domain and, responsive to receiving the notification, sending the repository to the border leaf switch to enable the border leaf switch to send a consolidated IGMP proxy report on behalf of the leaf switches to the multicast router based on the repository and that indicates the multicast membership of interest in the given bridge domain, in lieu of sending the multiple IGMP join requests and the IGMP leave requests to the multicast router.

2. The method of claim 1, wherein each entry in the multicast groups membership repository includes a bridge domain identifier for the given bridge domain, a multicast group Internet Protocol (IP) address, and a source IP address of the multicast router.

3. The method of claim 1, further comprising, at the one or more switches:

maintaining a multicast router repository to identify at any given time border leaf switches in the switch fabric that are connected to multicast routers and associated bridge domains; and sending the multicast group membership repository to all of the border leaf switches indicated in the multicast router repository.

4. The method of claim 1, wherein each leaf switch is connected to each spine switch in the switch fabric and each spine switch is connected to each leaf switch in the switch fabric.

5. The method of claim 1:

wherein the leaf switches are configured to connect with the host devices and multicast routers on front-facing ports of the leaf switches and the spine switches on rear-facing ports of the leaf switches;

distributing IGMP querier functionality across the leaf switches and the border leaf switches for the given bridge domain by:

enabling each of the leaf switches to operate as an IGMP querier to flood IGMP queries only to front-facing ports of the leaf switch configured for a given bridge domain and not to rear-facing ports of the leaf switch to prevent each leaf switch from receiving IGMP snooping queries from any other leaf switch; and configuring each of the leaf switches configured on the given bridge domain with a same IGMP source Internet Protocol (IP) address for the IGMP queries.

6. The method of claim 5, further comprising:

if one of the leaf switches is connected with a multicast router, performing an IGMP querier election procedure at the leaf switch and the multicast router connected thereto to elect either the leaf switch or the multicast router as a designated IGMP querier for the given bridge domain based on querier election rules.

7. The method of claim 5, wherein the performing an IGMP querier election procedure includes comparing a source IP address in a IGMP query from the border leaf switch against a source IP address in a IGMP query from the multicast router connected to the border leaf switch, and electing as the designated IGMP querier the one of the border leaf switch and the multicast router having a lowest source IP address.

8. The method of claim 1, wherein the notification from the border leaf switch identifies the given bridge domain and an address of the border leaf switch.

9. A method of Internet Group Management Protocol (IGMP) snooping in a spine-leaf cluster switch fabric including interconnected spine and leaf switches that collectively perform IGMP snooping, comprising:

flooding an IGMP query, received at a border leaf switch in the spine-leaf cluster switch fabric and originated at a multicast router connected to the border leaf switch, to all host devices in a given bridge domain to which the query is directed through leaf switches of the fabric to which the host devices are connected;

in response to the flooding, receiving at the leaf switches IGMP join requests from the connected host devices in the given bridge domain and by which the host devices indicate interest in multicast group membership in the given bridge domain, and receiving at the leaf switches IGMP leave requests from various ones of the host devices in the bridge domain to indicate that the various ones of the host devices are no longer interested in multicast group membership in a respective bridge domain;

receiving, by a repository service hosted on one or more of the network switches, from the leaf switches the IGMP join requests and the IGMP leave requests;

consolidating, by the respository service, the multiple IGMP join requests across the leaf switches into entries of a multicast groups membership repository stored with the repository service and that indicate for each leaf switch the multicast group membership of interest in the given bridge domain as expressed in the multiple IGMP join requests, and deleting entries of the multicast groups membership repository corresponding to each leaf switch that is no longer interested in multicast group membership in the respective bridge domain as expressed by the IGMP leave requests, wherein the multicast groups membership repository includes entries that collectively identify multicast group membership across multiple bridge domains over time;

by the repository service, receiving a notification from the border leaf switch indicating the border leaf switch is connected to the multicast router and the given bridge domain and, responsive to receiving the notification, sending the repository to the border leaf switch; and receiving, by the border leaf switch, the repository and, in response, sending from the border leaf switch to the multicast router a consolidated IGMP proxy report representative of the multiple join requests and the leave requests that indicate the multicast membership of interests in the given bridge domain indicated in the received repository.

10. The method of claim 9, further comprising:
creating a multicast router repository that maintains identities of all border leafs in the switch fabric that are connected to multicast routers.

11. The method of claim 9, wherein each entry in the multicast groups membership repository includes bridge domain identifier for the given bridge domain, a multicast group Internet Protocol (IP) address, and a source IP address.

12. The method of claim 9, further comprising:
distributing IGMP querier functionality across the leaf switches and the border leaf switches for the given bridge domain by:
enabling each of the leaf switches and the border leaf switches configured on the given bridge domain to operate as an IGMP querier to originate IGMP queries and flood the originated IGMP queries only to front-facing ports of the switch configured for the given bridge domain connected with host devices or multicast routers and not to rear-facing ports of the switch connected with spine switches to prevent each leaf switch and each border leaf switch from receiving IGMP snooping queries from any other leaf switch or border leaf switch; and
configuring each of the leaf and the border leaf switches configured on the given bridge domain with a same IGMP source Internet Protocol (IP) address for the IGMP queries.

13. The method of claim 12, further comprising:
performing an IGMP querier election procedure at each leaf switch and border leaf switch and multicast router connected thereto to elect either the leaf switch, border leaf switch, or the multicast router as a designated IGMP querier for the given bridge domain based on querier election rules.

14. The method of claim 13, wherein the performing an IGMP querier election procedure includes comparing a source IP address in a IGMP query from the border leaf switch against a source IP address in a IGMP query from the multicast router connected to the border leaf switch, and electing as the designated IGMP querier the one of the border leaf switch and the multicast router having a lowest source IP address.

15. The method of claim 9, further comprising, at the one or more switches:
receiving a notification from the border leaf switch indicating the border leaf switch is connected to the multicast router and the given bridge domain,
wherein the sending includes sending the repository to the border leaf switch responsive to the notification from the border leaf switch.

16. The method of claim 9, wherein each leaf switch is connected to each spine switch in the switch fabric and each spine switch is connected to each leaf switch in the switch fabric.

17. The method of claim 9, wherein the notification from the border leaf switch identifies the given bridge domain and an address of the border leaf switch.

18. One or more non-transitory computer readable storage media encoded with instructions that, when executed by a processor on a network switch in a spine-leaf cluster switch fabric, the switch fabric including interconnected leaf and spine switches that collectively perform Internet Group Management Protocol (IGMP) snooping in which (i) an IGMP query, originated at a multicast router that routes multicast traffic into and out of the switch fabric and that is received at a border leaf switch connected to the multicast router, is flooded to all host devices connected to the switch fabric in a given bridge domain to which the query is directed through leaf switches in the bridge domain, and (ii) responsive to the flooding, multiple IGMP join requests from the connected host devices are received at the leaf switches by which the host devices indicate interest in multicast group membership in the given bridge domain, cause the processor to implement a repository service configured to:
receive, by the repository service, from the leaf switches the multiple IGMP join requests, and IGMP leave requests that indicate various ones of the host devices that are no longer interested in multicast group membership in a respective bridge domain;
consolidate, by the repository service, the multiple IGMP join requests received at the leaf switches into entries of a multicast groups membership repository stored with the repository service and that indicate for each leaf switch the multicast group membership of interest in the given bridge domain as expressed in the multiple IGMP join requests, and delete entries of the multicast groups membership repository corresponding to each leaf switch that is no longer interested in multicast group membership as expressed by the IGMP leave requests, wherein the multicast groups membership repository includes entries that collectively identify multicast group membership across multiple bridge domains over time;
receive, by the repository service, a notification from the border leaf switch indicating the border leaf switch is connected to the multicast router and the given bridge domain; and
by the repository service, responsive to receiving the notification, send the repository to the border leaf switch to enable the border leaf switch to send a consolidated IGMP proxy report on behalf of the leaf switches to the multicast router based on the repository and that indicates the multicast membership of interest in the given bridge domain, in lieu of sending the multiple IGMP join requests and IGMP leave requests to the multicast router.

19. The one or more non-transitory computer readable storage media of claim 18, further comprising instructions to cause the processor to:
maintain a multicast router repository to identify at any given time border leaf switches in the switch fabric that are connected to multicast routers and associated bridge domains; and
send the multicast groups membership repository to all of the border leaf switches indicated in the multicast router repository.

20. The one or more non-transitory computer readable storage media of claim 18, further comprising instructions to cause the processor to create a multicast router repository that maintains identities of all border leafs in the switch fabric that are connected to multicast routers.

21. The one or more non-transitory computer readable storage media of claim 18, further comprising instructions to cause the processor to:
receive a notification from the border leaf switch indicating the border leaf switch is connected to the multicast router and the given bridge domain,
wherein the instructions to cause the processor to send include instructions to cause the processor to send the repository to the border leaf switch responsive to the notification from the border leaf switch.

22. The one or more non-transitory computer readable storage media of claim 18, wherein each leaf switch is connected to each spine switch in the switch fabric and each spine switch is connected to each leaf switch in the switch fabric.

23. The one or more non-transitory computer readable storage media of claim 18, wherein the notification from the border leaf switch identifies the given bridge domain and an address of the border leaf switch.

\* \* \* \* \*